United States Patent [19]

McAllister

[11] Patent Number: 4,989,903
[45] Date of Patent: Feb. 5, 1991

[54] FLEXIBLE FLOW THROUGH SADDLE

[75] Inventor: Keith R. McAllister, Davidsonville, Md.

[73] Assignee: The United States of America as represented by the Secretary of the Navy, Washington, D.C.

[21] Appl. No.: 383,112

[22] Filed: Jul. 21, 1989

[51] Int. Cl.⁵ .................... F16L 13/04; F16L 35/00
[52] U.S. Cl. .................... 285/114; 285/239; 285/175; 403/41
[58] Field of Search ............... 285/114, 115, 149, 239, 285/251, 175; 403/41, 194; 138/110; 24/115 R, 115 N, 131 C

[56] References Cited

U.S. PATENT DOCUMENTS

| | | | |
|---|---|---|---|
| 933,516 | 9/1909 | Witzenmann | 285/114 |
| 1,371,981 | 3/1921 | Rose | 285/114 |
| 2,185,741 | 1/1940 | Sorg et al. | 285/115 |
| 2,700,988 | 2/1955 | Smisko | 285/115 |
| 3,199,553 | 8/1965 | Garrett et al. | 141/388 |
| 3,921,257 | 11/1975 | Appleby et al. | 403/194 X |
| 4,367,967 | 1/1983 | Albert, Jr. | 403/41 |
| 4,395,802 | 8/1983 | Albert, Jr. | 24/115 N |
| 4,509,877 | 4/1985 | Sobin et al. | 403/41 |
| 4,565,493 | 1/1986 | Hallerback | 403/41 X |
| 4,794,957 | 1/1989 | Metzler, Jr. | 403/41 X |

OTHER PUBLICATIONS

Hose Rig Hardware, Part No. T04016-Size D, Aeroquip Catalog.
Commercially Produced Hose, Prior Art #7.

Primary Examiner—Dave W. Arola
Assistant Examiner—Franco S. DeLiguori
Attorney, Agent, or Firm—David S. Kalmbaugh

[57] ABSTRACT

A flexible flow through saddle for ship-to-ship refueling systems. The flexible flow through saddle includes a tubular structure having a pair of ribs located on the top and bottom of the tubular structure, each rib having an aperture therein. Extending from each end of the tubular structure and having an end portion thereof connected to the tubular structure is a helical shaped wire. The opposite end portion of each helical shaped wire is connected to a coupling member. That portion of each helical shaped wire between the coupling member and the tubular structure is encased in an elastomeric material which provides for flexibility and prevents premature fatigue and rupture of a hose element connected by the coupling member to the tubular structure through the encased helical shaped wire.

8 Claims, 3 Drawing Sheets

U.S. Patent    Feb. 5, 1991    Sheet 3 of 3    4,989,903
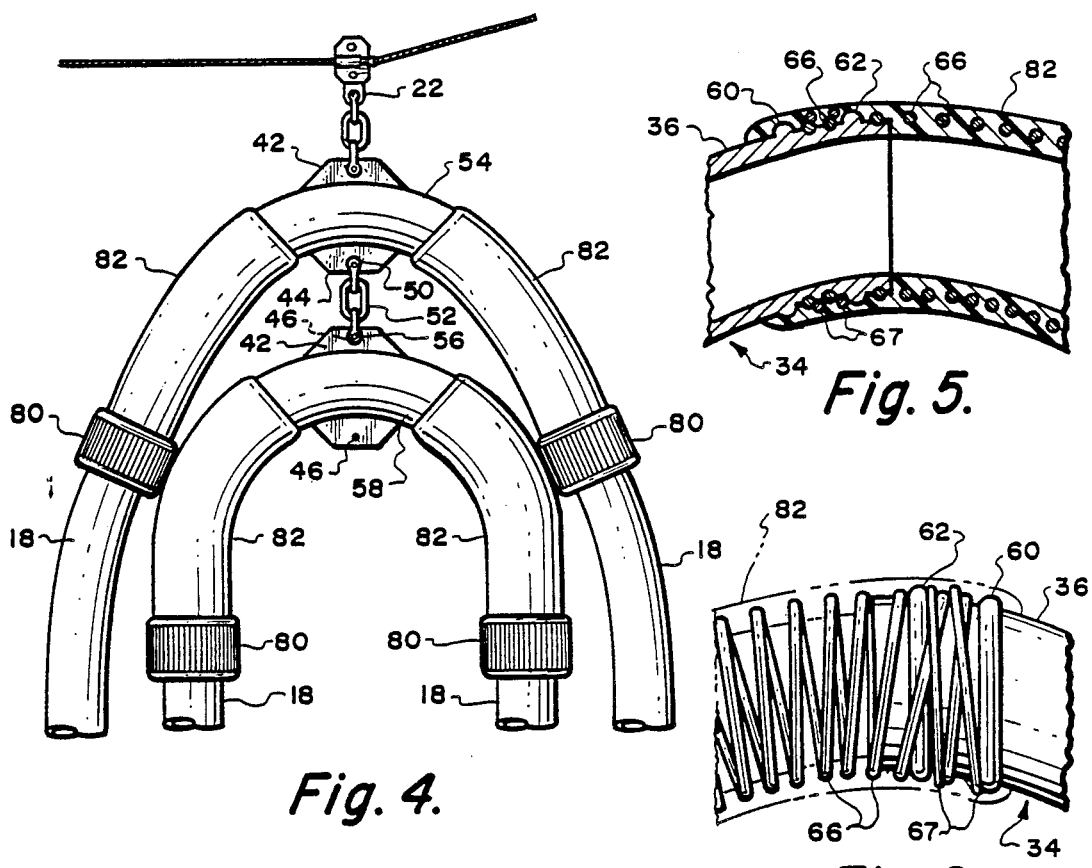
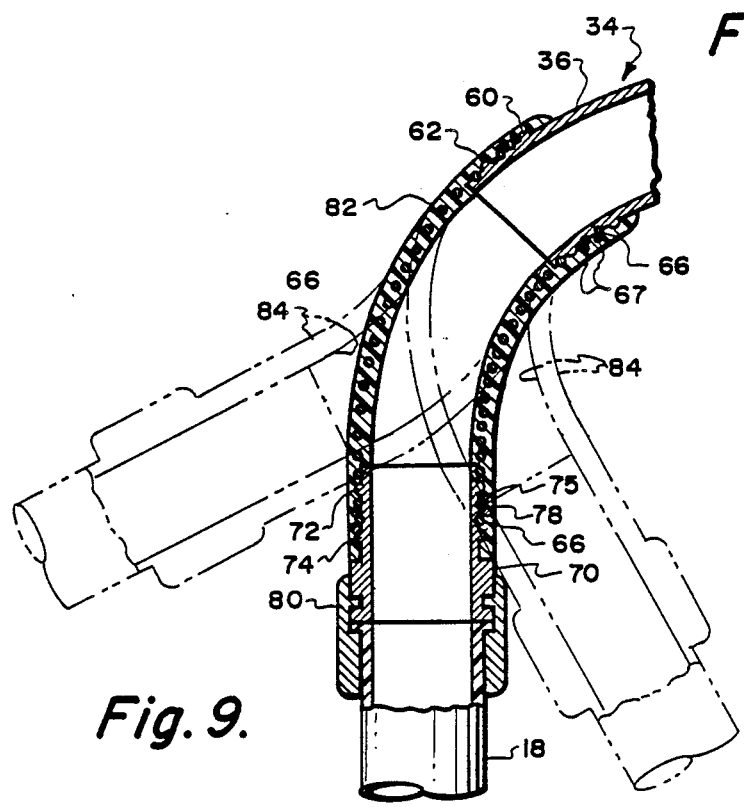

FLEXIBLE FLOW THROUGH SADDLE

BACKGROUND OF THE INVENTION

1. Field of the Invention

This invention relates to the art of strain reliefs and more particularly, to a bending strain relief device for a hose.

2. Description of the Prior Art

In the past, when refueling one ship at sea by another with liquid fuel, it has been the practice to use a refueling system which connects the ships with a span wire or cable and trolleys a flexible hose or conduit on the span wire or cable from one ship to the other. These refueling systems generally include flow through saddles which are attached to a trolley, connect the elements of the hose and provide for a point of suspension of the hose.

The portions of the hose adjacent a flow through saddle are subject to extraordinary stresses since the flow through saddle is rigid and that portion of the hose immediately beyond the flow through saddle is free to flex. These stresses may result in premature fatigue and rupture of the hose at or adjacent to the hose's point of entry into the flow through saddle.

One strain relief device of the prior art is Harry A. Appleby and Frank Albert, Jr. U.S. Pat. No 3,921,257. An appliance for linear bodies is disclosed therein which includes a flange having several apertures, each aperture being adapted to receive one end of a helically preformed rod. The rods extend forward from the flange tapering naturally into a helically wrapped gripping engagement with the cable. A resilient material is integrally molded about the forward extending portion of the helical rods.

Frank Albert Jr. U.S. Pat. No. 4,367,967 also discloses a bending strain relief device in the form of an elongated tubular member having a plurality of rigid sleeve members positioned one after another along an axis and connected together by an elastomeric material which deforms and flows during angular movement of adjacent sleeve members thereby limiting the degree of curvature which can be imparted to the tubular member.

While satisfactory for their intended purpose of providing strain relief to cables, these devices of the prior art ordinarily leave something to be desired, especially from the standpoints of compatibility with hoses used in state-of-the-art ship-to-ship refueling systems, design complexity, durability and overall operation efficiency.

SUMMARY OF THE INVENTION

The present invention overcomes some of the disadvantages of the prior art including those mentioned above in that it comprises a relatively simple strain relief device for use with a ship-to-ship refueling system.

Included in the present invention is a tubular structure having a pair of ribs located on the top and bottom thereof, each rib having an aperture therein. A helical shaped wire extends from each end of the tubular structure and has an end portion thereof secured to the tubular structure by a binding wire. The opposite end portion of each helical shaped wire is secured to a coupling member by a binding wire. That portion of each helical shaped wire between the coupling member and the tubular structure is encased in an elastomeric material which provides for flexibility and prevents premature fatigue and rupture of a hose element connected by the coupling member to the tubular structure through the encased helical shaped wire.

BRIEF DESCRIPTION OF THE DRAWINGS

FIG. 4 is a view showing a pair of flexible flow through saddles connected to a trolley.

FIG. 5 is an enlarged cross sectional view of one end of the tubular members of FIG. 3 taken along line 5—5.

FIG. 6 is an enlarged top view of one end of the tubular member of FIG. 3 taken along line 6—6. Elastomeric material shown in phantom for clarity.

FIG. 9 is view showing the elastomeric material of the present invention in the flow through and stowage configuration.

DESCRIPTION OF THE PREFERRED EMBODIMENT

Figure 1:
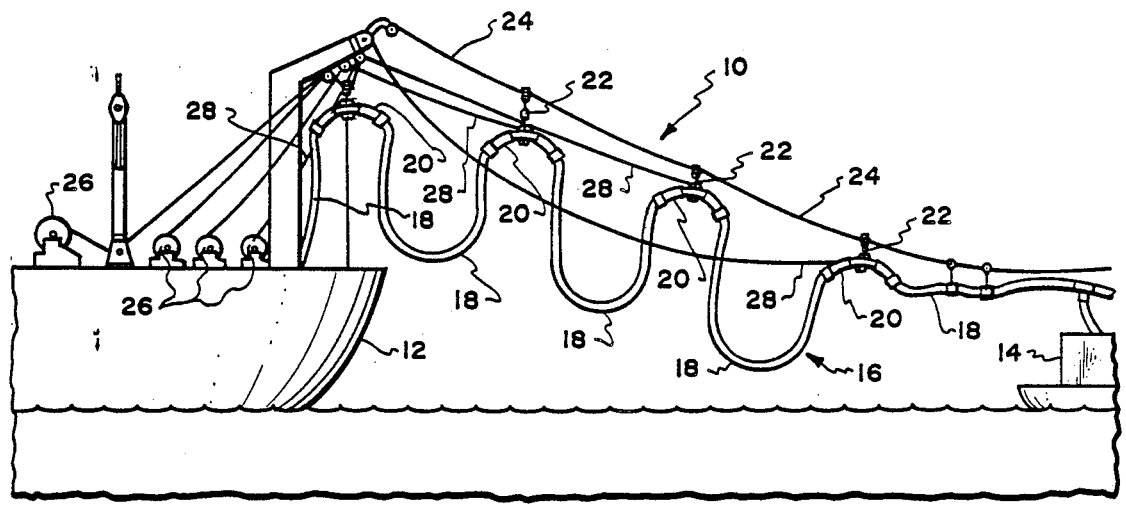
FIG. 1 is a view showing a ship-to-ship refueling system utilizing the present invention.

The preferred embodiment of the present invention will now be discussed in some detail in conjunction with all of the figures of the drawing, wherein like parts are designated by like reference numerals, insofar as it is practical to do so.

Referring first to FIG. 1, there is shown a ship-to-ship refueling system 10 which is permanently installed on a fuel supply ship 12 and adapted to supply a receiving ship 14 with fuel. Refueling system 10 includes a flexible hose 16 having a plurality of hose sections 18, sections 18 of hose 16 being joined together by a plurality of flow through saddles 20.

Each saddle 20 has attached thereto a trolley 22 which is in slidable engagement with a span wire 24 connected between supply ship 12 and receiving ship 14.

Supply ship 12 has a plurality of span wire winches 26, each of which has a retrieving wire 28 attached to one of the plurality of trolleys 22. When ship-to-ship refueling system 10 is operational, hose 16 is deployed as shown in FIG. 1. When refueling of ship 14 is complete, winches 26 are activated pulling trolleys 22 to supply ship 12 thus folding hose sections 18.

Figure 2:
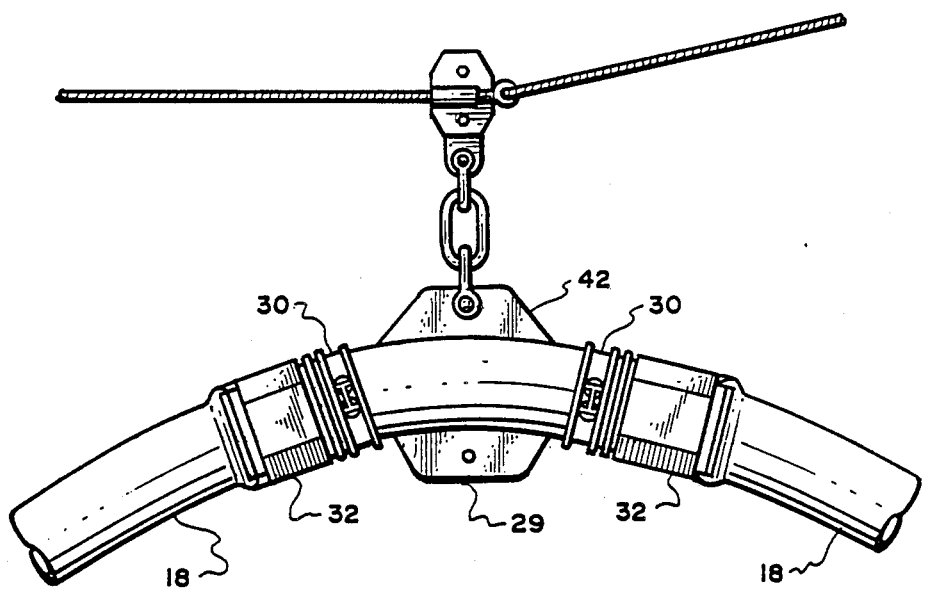
FIG. 2 illustrates an example of a prior art flow through saddle.

Referring now to FIG. 2, there is shown a prior art flow through saddle 29 having at each end thereof a coupling member 30 which connects with a coupling member 32 attached to hose element 18.

Referring to FIGS. 1 and 2, when hose 16 is folded after refueling ship 14, or when hose 16 is operationally deployed as shown in FIG. 1 stresses are applied to the section of hose element 18 adjacent coupling member 32. These stresses may result in premature fatigue and rupture of hose element 18 at or near coupling member 32.

Figure 3:
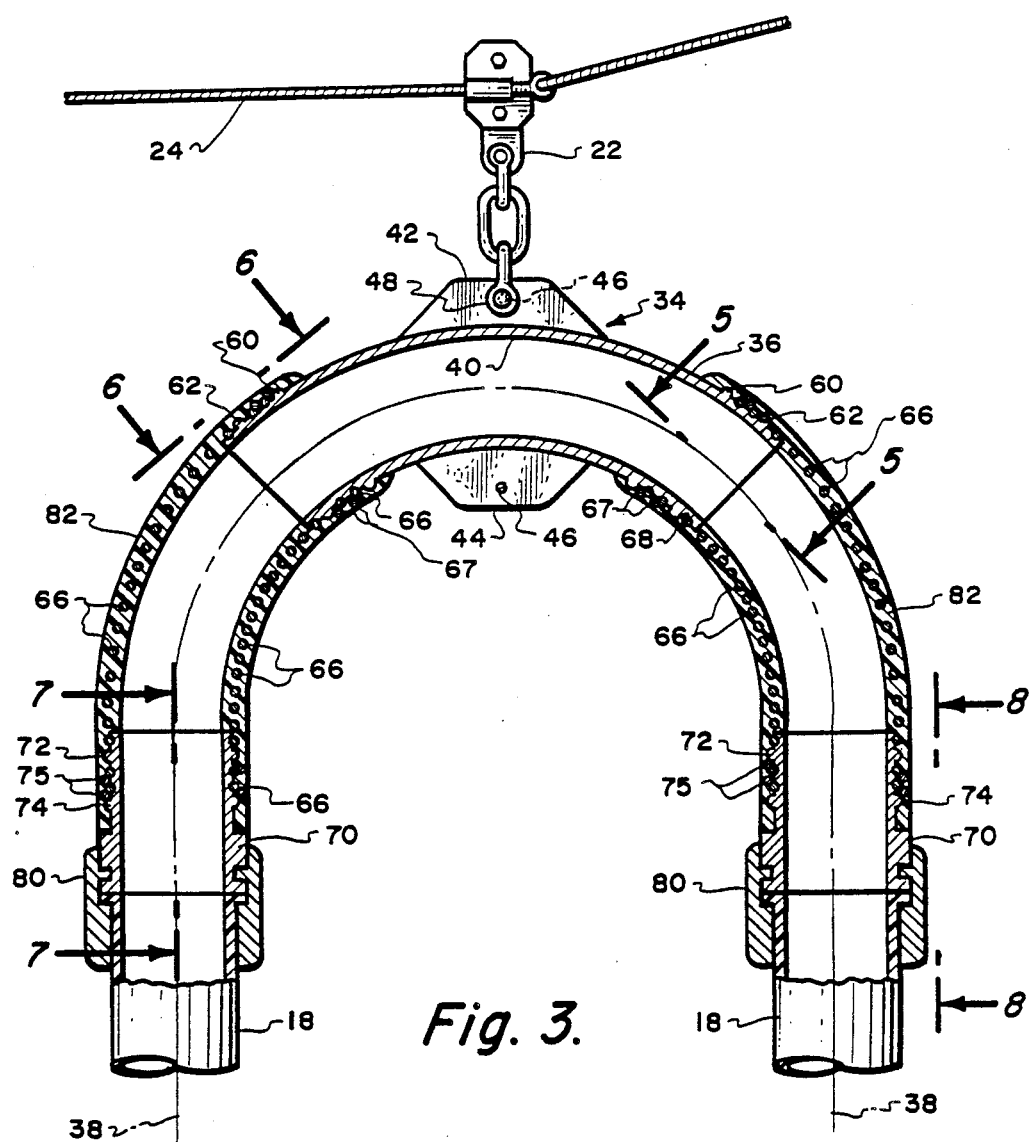
FIG. 3 is a cross sectional view of the flexible flow through saddle constituting the present invention.

Referring now to FIG. 3, there is shown a flexible flow through saddle 34 having a tubular member 36, and an axis 38. Tubular member 36 which may be fabricated from aluminum has a cylindrical passage 40 extending therethrough and a pair of ribs 42 and 44, with rib 42 being positioned on top of tubular member 36 and rib 44 being positioned on the bottom of tubular member 36. Ribs 42 and 44 each have an aperture 46 located therein, with aperture 46 of rib 42 being adapted to receive a bolt 48 so as to connect trolley 22 to saddle 34. In a like manner and as is best illustrated in FIG. 4, a bolt 50 passing through aperture 46 of rib 44 connects one end of a chain 52 to rib 44 of flexible flow through saddle 54. A bolt 56 passing through aperture 46 of rib 42 connects rib 42 of flexible flow through saddle 58 to the opposite end of chain 52. At this time, it should be noted that multiple flexible flow through saddles may be connected to trolley 22 in the manner described above.

Referring to FIGS. 3, 5 and 6, there is shown a pair or protrusions 60 and 62 located near each end of tubular member 36. One end of a wire 66 is wrapped around the outer surface of tubular member 36 between protrusions 60 and 62 in a helical pattern and then passes over protrusion 62. A binding wire 67 is circumferentially wound around tubular member 36 between protrusions 60 and 62 and above wire 66 so as to secure wire 66 to tubular member 36. Binding wire 67 is, in turn, attached to tubular member 36 by welds, not shown.

At this time it should be noted that wire 66 may comprise stainless steel, or any other steel alloy, or composite fiber which may be wrapped or wound in a helical pattern.

Figure 7:
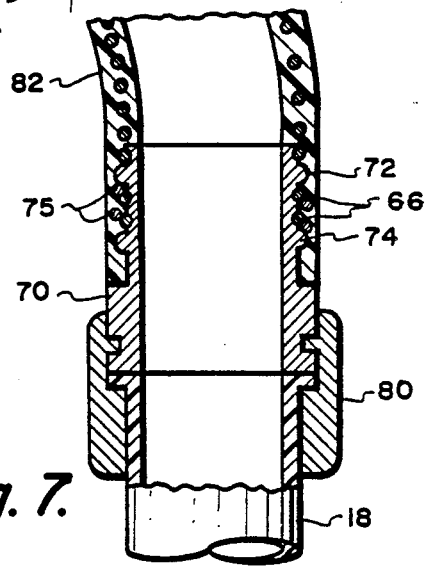
FIG. 7 is an enlarged cross sectional view of the male coupling member of FIG. 3 taken along line 7—7.
Figure 8:
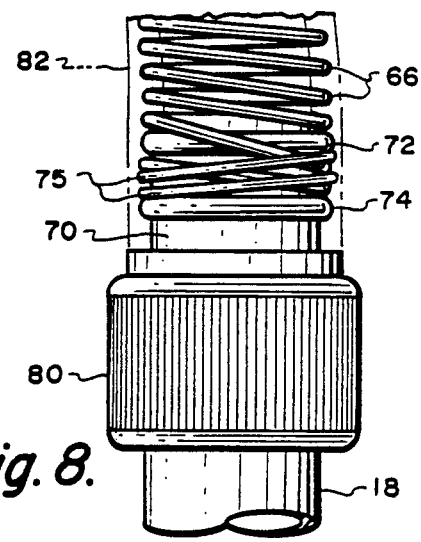
FIG. 8 is an enlarged top view of the coupling member of FIG. 3 taken along line 8—8. Elastomeric material shown in phantom for clarity.

Referring to FIGS. 3, 7 and 8, the helical pattern of wire 66 is maintained along axis 38 with the spacing between helical sections of wire 66 gradually increasing to the center point of wire 66 and then gradually decreasing until wire 66 is secured to a coupling member 70 which has a pair of protrusions 72 and 74.

The opposite end of wire 66 is wrapped around the outer surface of coupling member 70 between protrusions 72 and 74 in a helical pattern and then passes over protrusion 72. A binding wire 75 is circumferentially wound around coupling member 70 and above wire 66 so as to secure wire 66 to member 70. Binding wire 75 is, in turn, attached to member 70 by welds, not shown.

Coupling member 70 is adapted to receive a coupling member 80 attached to hose element 18 and thereby couple hose element 18 to saddle 34. Coupling members 70 and 80 may be split-clamp couplings fabricated according to military specification MIL-C-24356, although it should be recognized that there are several commercially available couplings which could be used with the present invention.

As is best illustrated in FIGS. 3 and 9 that portion of each wire 66 positioned between the end of tubular member 36 and coupling member 70 is completely encapsulated within an elastomeric material 82. Elastomeric material 82 is molded about and bonded to the outer surface of each coupling member 70, is molded about that portion of wire 66 wound around each coupling member 70, and also is molded about each binding wire 75. Similarly, elastomeric material 82 is molded about and bonded to the outer surface of each end of tubular member 36, is molded about that portion of wire 66 wound around each end of tubular member 36, and is also molded about each binding wire 67. In one arrangement elastomeric material 82 may comprises polyurethane which is readily deformable elastically. It will be recognized that many other elastomeric materials could be used with the present invention such as synthetic or natural rubber, polyvinylchloride and the like.

Elastomeric material 82 is formed such that cylinder 40 is maintained along axis 38 the entire length of flexible flow through saddle 34.

Referring to FIGS. 1 and 9, there is shown elastomeric material 82, represented by dash lines 84, in a curved or flow through configuration which would allow for ship-to-ship refueling as is best illustrated in FIG. 1 of the drawings. When stored, elastomeric material 82 of flexible flow through saddle 34 is in a vertical or stowed rig configuration. By using elastomeric material 82 reinforced with helical wire 66 to provide a stiffness transition from rigid at tubular member 36 to flexible at male coupling 70, flexible flow through saddle 34 permits stowage and deployment of hose 16 without unreasonable stress and possible rupture or breakage of hose 16. Since over 90 percent of hose failures occur within two feet of a saddle coupling, use of flexible flow through saddle 34 will significantly reduce such failures and provide for a workable ship-to-ship refueling system.

From the foregoing, it may readily be seen that the subject invention comprises a new, unique and exceedingly useful flexible flow through saddle for a ship-to-ship refueling system which constitutes a considerable improvement over the known prior art. Obviously many modifications and variations of the present are possible in light of the above teachings. It is, therefore, to be understood that within the scope of the appended claims the invention may be practiced otherwise then as specifically described.

What is claimed:

1. A bending strain relief device for use in connecting the elements of a hose in a ship-to-ship refueling system, comprising:

an elongated tubular member having an axis, an inner cylindrical surface, a pair of protrusions at each end thereof and a pair of ribs, said first rib being positioned on top of said tubular member and having an aperture, and said second rib being positioned on the bottom of said tubular member and having an aperture;

first and second coupling members positioned along said axis, each of said coupling members having a pair of protrusions;

a first helical shaped wire having one end wound in a helical pattern between the protrusions of one end of said tubular member, and passing over one of said protrusions of said tubular member, and having the opposite end wound in a helical pattern between the protrusions of said first coupling member and passing over one of said protrusions of said first coupling member, said first helical shaped wire extending along said axis from said tubular member to said first coupling member;

a second helical shaped wire having one end wound in a helical pattern between the protrusions of the other end of said tubular member, and passing over one of said protrusions of said tubular member, and having the opposite end wound in a helical pattern between the protrusions of said second coupling member and passing over one of said protrusions of said second coupling member, said second helical shaped wire extending along said axis from said tubular member to said second coupling member;

first, second, third and fourth binding wires, said first binding wire being wound around one end of said first helical shaped wire so as to secure said first helical shaped wire to said one end of said tubular member, said second binding wire being wound around the opposite end of said first helical shaped wire so as to secure said first helical shaped wire to said first coupling member, said third binding wire being wound around one end of said second helical shaped wire so as to secure said second helical shaped wire to said other end of said tubular member and said fourth binding wire being wound around the opposite end of said second helical shaped wire so as to secure said second helical shaped wire to said second coupling member; and a deformable elastomeric material, encasing said first helical shaped wire between said first coupling member and said tubular member and encasing said second helical shaped wire between said second coupling member and said tubular member, said elastomeric material having an inner cylindrical surface of the same diameter as the inner cylindrical surface of said tubular member.

2. The bending strain relief device of claim 1 wherein said tubular member is fabricated from aluminum.

3. The bending strain relief device of claim 1 wherein said helical shaped wire is fabricated from stainless steel.

4. The bending strain relief device of claim 1 wherein said elastomeric material comprises neoprene rubber.

5. The bending strain relief device of claim 1 wherein said elastomeric material comprises polyvinylchloride.

6. The bending strain relief device of claim 1 further characterized by a trolley having bolt in engagement with the aperture of said first rib so as to connect said trolley to said bending strain relief device.

7. The bending strain relief device of claim 1 further characterized by first and second hose elements, each of said hose elements having at least one coupling member at end thereof, the coupling member of the first of said hose elements being connected to the first coupling member of said bending strain relief device and the coupling member of the second of said hose elements being connected to the second coupling member of said bending strain relief device.

8. The bending strain relief device of claim 1 wherein said elastomeric material is molded about and bonded to the outer surface of each end of said tubular member, is molded about that portion of said first and second helical shaped wires wound around each end of said tubular member, is molded about that portion of said first and second helical shaped wires respectively wound around said first and second coupling members, and is molded about each of said binding wires.

* * * * *